US010496992B2

(12) United States Patent
Lei et al.

(10) Patent No.: US 10,496,992 B2
(45) Date of Patent: Dec. 3, 2019

(54) EXCLUSION OF NODES FROM LINK ANALYSIS

(71) Applicant: Vesta Corporation, Portland, OR (US)

(72) Inventors: John Lei, Portland, OR (US); Jianning Le, Lake Oswego, OR (US); Jiaqi Yu, Sherwood, OR (US); Fang Li, Lake Oswego, OR (US); Robert Marssdorf, Portland, OR (US)

(73) Assignee: Vesta Corporation, Portland, OR (US)

( * ) Notice: Subject to any disclaimer, the term of this patent is extended or adjusted under 35 U.S.C. 154(b) by 475 days.

(21) Appl. No.: 14/951,119

(22) Filed: Nov. 24, 2015

(65) Prior Publication Data

US 2017/0148026 A1     May 25, 2017

(51) Int. Cl.
*G06Q 40/00* (2012.01)
*G06Q 20/40* (2012.01)

(52) U.S. Cl.
CPC ............... *G06Q 20/4016* (2013.01)

(58) Field of Classification Search
USPC ...................................... 705/35–40
See application file for complete search history.

(56) References Cited

U.S. PATENT DOCUMENTS 5,819,226 A    10/1998 Gopinathan
7,793,835 B1 *  9/2010 Coggeshall ........... G06F 21/552
                                                  235/375
8,919,641 B2   12/2014 Bishop et al.
9,740,991 B2    8/2017 Seidman
9,892,465 B2 *  2/2018 Love ..................... G06Q 10/10
2002/0099649 A1 * 7/2002 Lee ...................... G06Q 20/04
                                                      705/38

(Continued)

FOREIGN PATENT DOCUMENTS

EP          2790146         10/2014

OTHER PUBLICATIONS

Press Release: Banorte strengthens Fraud Prevention with Next Generation Advanced Authentication Technology from CA Technologies, Dow Jones Institutional News; New York [New York] (Year: 2015).*

(Continued)

*Primary Examiner* — Edward J Baird
(74) *Attorney, Agent, or Firm* — Beyer Law Group LLP

(57) ABSTRACT

A payment processing system continuously processes transactions. Upon arrival, in real-time, a transaction is parsed and each entity is used to retrieve other previous transactions associated with that entity in order to build a link analysis web. Iteratively, each entity in the retrieved transactions is used to retrieve other associated transactions, etc. Before retrieval of associated transactions, each entity is checked whether it appears in a bypass table. If so, that entity is not used to retrieve transactions. Once built, transactions and entities within the link analysis web are analyzed to determine whether the current transaction is fraudulent. Off-line or online, risk metrics such as address mismatch rate, bank decline rate, ticket decline rate and new payment device rate, along with the proportion of a linked entity is used to determine whether that linked entity is erroneous and should be placed into the bypass table and excluded from the web.

10 Claims, 11 Drawing Sheets

(56) References Cited

U.S. PATENT DOCUMENTS

| | | | |
|---|---|---|---|
| 2003/0006277 A1* | 1/2003 | Maskatiya | G06Q 20/18 235/379 |
| 2007/0087756 A1* | 4/2007 | Hoffberg | G06Q 10/0631 455/450 |
| 2007/0106582 A1 | 5/2007 | Baker | |
| 2008/0010189 A1* | 1/2008 | Rosenberger | G06Q 20/10 705/39 |
| 2008/0015978 A1 | 1/2008 | Curry | |
| 2008/0027860 A1* | 1/2008 | Mullen | G06Q 20/04 705/39 |
| 2008/0275748 A1* | 11/2008 | John | G06Q 30/06 705/35 |
| 2009/0222243 A1 | 9/2009 | Zoldi | |
| 2010/0057622 A1 | 3/2010 | Faith | |
| 2010/0280880 A1 | 11/2010 | Faith | |
| 2011/0131122 A1 | 6/2011 | Griffin | |
| 2011/0173116 A1 | 7/2011 | Yan | |
| 2011/0225158 A1* | 9/2011 | Snyder | G06Q 30/02 707/737 |
| 2011/0238510 A1* | 9/2011 | Rowen | G06K 9/00187 705/16 |
| 2011/0307381 A1 | 12/2011 | Kim | |
| 2012/0030083 A1 | 2/2012 | Newman | |
| 2012/0036073 A1 | 2/2012 | Basu | |
| 2013/0282562 A1* | 10/2013 | Gallo | G06Q 20/12 705/39 |
| 2014/0156568 A1 | 6/2014 | Ganguly | |
| 2014/0244503 A1 | 8/2014 | Sadlier | |
| 2014/0258118 A1 | 9/2014 | Scott | |
| 2014/0258162 A1* | 9/2014 | Maran | G06F 16/24 705/325 |
| 2014/0279494 A1 | 9/2014 | Wiesman | |
| 2014/0351129 A1 | 11/2014 | Finot et al. | |
| 2015/0026062 A1 | 1/2015 | Paulsen | |
| 2015/0039513 A1* | 2/2015 | Adjaoute | G06Q 20/4016 705/44 |
| 2015/0066739 A1 | 3/2015 | Luca, Jr. | |
| 2015/0066797 A1* | 3/2015 | Outwater | G06Q 10/083 705/333 |
| 2015/0095247 A1 | 4/2015 | Duan | |
| 2015/0170147 A1 | 6/2015 | Geckle | |
| 2015/0339673 A1* | 11/2015 | Adjaoute | G06F 16/283 705/30 |
| 2016/0005029 A1 | 1/2016 | Ivey | |
| 2016/0057248 A1 | 2/2016 | Tankha | |
| 2016/0171498 A1 | 6/2016 | Wang | |
| 2016/0210631 A1* | 7/2016 | Ramasubramanian | G06Q 20/4016 |
| 2016/0283942 A1 | 9/2016 | Chitragar et al. | |
| 2016/0342963 A1 | 11/2016 | Zoldi | |
| 2017/0083985 A1* | 3/2017 | Lacoss-Arnold | G06Q 40/12 |
| 2017/0132866 A1* | 5/2017 | Kuklinski | G07D 7/20 |
| 2017/0148024 A1 | 5/2017 | Yu et al. | |
| 2017/0148025 A1 | 5/2017 | Le et al. | |

OTHER PUBLICATIONS

International Search Report dated Jan. 24, 2017 from International Application No. PCT/US2016/062545.
Written Opinion dated Jan. 24, 2017 from International Application No. PCT/US2016/062545.
Office Action for U.S. Appl. No. 14/951,060, dated Jun. 15, 2018.
Office Action for U.S. Appl. No. 14/951,060, dated Sep. 28, 2018.
Office Action for U.S. Appl. No. 14/951,060, dated Jan. 11, 2019.
Office Action for U.S. Appl. No. 14/951,087, dated Mar. 21, 2018.
Office Action for U.S. Appl. No. 14/951,087, dated Sep. 25, 2018.
Office Action for U.S. Appl. No. 14/951,087, dated Dec. 20, 2018.
Office Action for U.S. Appl. No. 14/951,135, dated Jun. 6, 2018.
Office Action for U.S. Appl. No. 14/951,135, dated Oct. 17, 2018.
Office Action for U.S. Appl. No. 14/951,135, dated Mar. 27, 2019.
Final Office Action for U.S. Appl. No. 14/951,060, dated Aug. 6, 2019.
Final Office Action for U.S. Appl. No. 14/951,087, dated Jul. 1, 2019.

* cited by examiner

Link Analysis System

Link Analysis Web Based Upon IP
Address of a Transaction

| | |
|---|---|
| IP Address | — 704 |
| SVA Number | — 708 |
| Full Name, Postal Code | — 712 |
| ANI | — 716 |
| E-mail Address | — 720 |
| Payment Device Account No. | — 724 |
| Customer Identifier | — 728 |
| Source CD | — 732 |
| Address, Standard ID | — 736 |
| Gift Card No. | — 740 |
| SVA MDN | — 744 |
| Street, Postal Code | — 748 |
| Payment Device ID | — 752 |
| TM Fuzzy Device ID | — 756 |
| TM Device ID | — 760 |
| SVA ID | — 764 |

List of Bypass Tables

*FIG. 8*

EXCLUSION OF NODES FROM LINK ANALYSIS

CROSS-REFERENCE TO RELATED APPLICATIONS

This application is related to U.S. patent application Ser. Nos. 14/951,060 14/951,087 14/951,135, filed on the same date herewith, which are hereby incorporated by reference.

FIELD OF THE INVENTION

The present invention relates generally to fraud detection using link analysis. More specifically, the present invention relates to excluding nodes in link analysis to improve fraud detection.

BACKGROUND OF THE INVENTION

In this digital age, merchants are challenged by customers who want near instantaneous transactions across multiple channels and the need to reduce fraudulent transactions. At the same time, merchants struggle to enhance fraud detection for the rapidly growing market of digital goods.

With the prevalence of computers, mobile telephones and the Internet, buyers and sellers can now interact without seeing one another; card-not-present (CNP) transactions in which the merchant never sees the payment card are now much more common. As e-commerce becomes more popular and digital sales and delivery more common, merchants struggle to contain fraudulent payments without inconveniencing customers. A glitch during an e-commerce transaction can result in loss of the transaction for the merchant.

Unfortunately, card-not-present transactions—many of which are performed using computers, a telephone or mobile devices—are responsible for a great deal of fraud. But, increasing fraud controls and tightening up fraud detection algorithms in order to detect fraud during a transaction can result in a good transaction being denied and a good customer being turned away. Most fraud detection systems are not yet able to handle the increase in online card-not-present transactions and especially the sale and delivery of digital goods.

One type of software tool used in a fraud detection system is known as link analysis. Link analysis is used in law enforcement to find associated individuals or behaviors and in building social networks, and can be useful in fraud detection. For example, consider a fraudster who has stolen a large number of credit card numbers and is attempting to use those cards to complete transactions from his or her computer—and is trying to fool the fraud detection system into thinking that all of these transactions are from different people. Link analysis can be used to analyze any links between all of these transactions and to eventually conclude that many cards are being used from a single IP address—indicating an anomaly or fraud. Thus, link analysis allows one to link disparate transactions in order to find fraud.

But, it is important in link analysis to identify erroneous links that may cause misidentification. For example, one hundred orders may originate from the same IP address because that IP address is used by all guests of a hotel, or because that is the IP address of a gateway proxy server. Or, the same billing address may be listed for numerous transactions because that is the billing address of a corporate credit card or the address of an apartment complex. In addition, the entity "caller ID" may be the same for many transactions because that telephone number is an exchange number or an 800 number. Thus, even though an entity in all of these transactions is the same, this common link does not indicate (in these examples) that all transactions are originating from a fraudster.

Some existing technologies use a static exclusion list that accumulates over time in order to differentiate between a corporate firewall IP address (from which different users execute electronic-commerce transactions) and an IP address of a home computer which a fraudster is using to impersonate numerous people using stolen identities or stolen payment cards. A static exclusion list is not optimal and is often ineffective because manually maintaining a static exclusion list is not a scalable solution. Adding or removing entries from the list usually causes delay, and the list needs to be manually reviewed. Thus, further techniques and systems are desired to improve link analysis.

SUMMARY OF THE INVENTION

To achieve the foregoing, and in accordance with the purpose of the present invention, a link analysis system is disclosed that excludes nodes from link analysis in real time in order to improve fraud detection.

The present invention rapidly determines in real time if a certain node in link analysis is erroneous by calculating a number of risk metrics associated with a set of transactions, such as, the address mismatch rate, the new payment device rate, etc. If an erroneous node is not excluded from the analysis, then link analysis can be difficult to use and the results may not be accurate. Exclusion of erroneous nodes in real time that should not be part of the analysis allows more transactions to be accepted and reduces false positives. It is realized that even though a certain entity across transactions may be the same (e.g., two people having the same name), that further information can be collected regarding a transaction set in order to conclude that a particular node should be excluded from link analysis.

BRIEF DESCRIPTION OF THE DRAWINGS

The invention, together with further advantages thereof, may best be understood by reference to the following description taken in conjunction with the accompanying drawings in which:

FIG. 8 lists numerous bypass tables that may be used in steps 440 and 412 in order to exclude a particular entity and node from the link analysis web.

DETAILED DESCRIPTION OF THE INVENTION

As discussed above, link analysis is useful in the prevention of fraud involving payment cards in the payment industry. In one embodiment, link analysis is used within a global, online payment processing system such as that operated by Vesta Corporation of Portland, Oreg. The payment processing system is suitable for use with international card networks, local payment networks, and can process payments in numerous currencies.

Payment Processing System Overview

Figure 1:
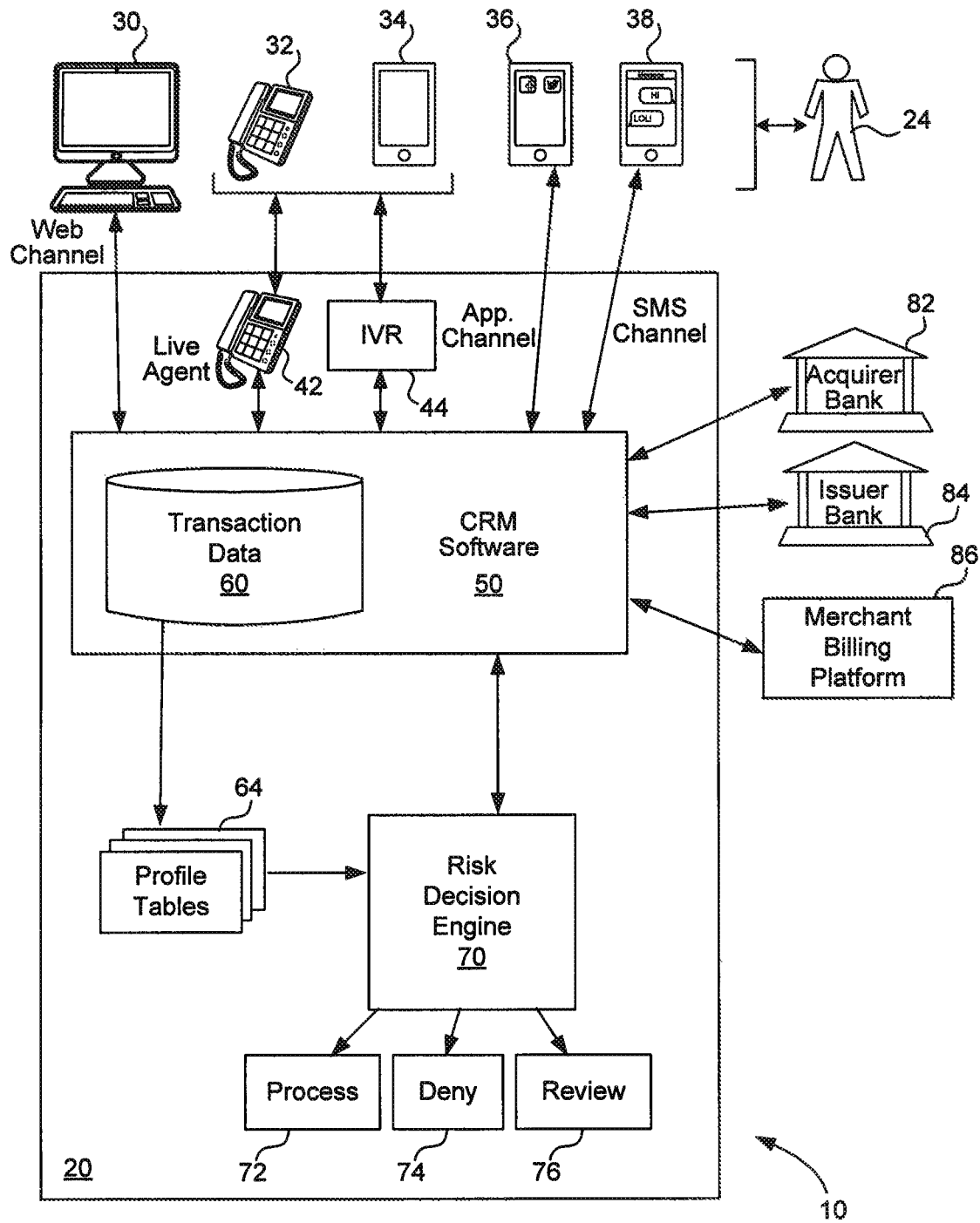
FIG. 1 is an example of a payment processing system that includes a link analysis system.

FIG. 1 illustrates an exemplary payment processing system 10 according to one embodiment of the invention that includes an anomaly detection system. An individual 24 desires to process a transaction using a payment card and utilizes any of channels 30-38 that communicate with an enterprise processor 20 in order to determine whether or not to process the transaction. The transaction may be to provide payment for any type of physical goods, for digital goods, or for a service such as recharging a mobile telephone or device, topping up a mobile telephone, incrementing a prepaid account, bill payment, money transfer, digital download, electronic tickets, online games, online gambling, and so on. The digital goods may include airline tickets, event tickets, gift cards, virtual gift cards, reloading money onto a gift card, digital music, credit for games, etc. The payment card (not shown) that the individual desires to use may be a credit card, a charge card, a debit card or another physical card, or even a virtual card such as PayPal, crypto currency, eCheck and so on. In general, the transaction is a card-not-present (CNP) transaction because although the individual 24 is in possession of the card (or at least knows the card number, expiration date, etc.), the merchant is unable to see the card because the individual is remote and is using an electronic channel in order to complete the transaction.

The channels include a Web channel in which the individual typically uses a computer 30 (desktop, laptop, tablet, etc.) in order to submit a transaction to the processor 20, although the individual may also use a mobile telephone with a Web browser to submit a transaction. More traditionally, the individual may use a corded or cordless telephone 32, or a mobile telephone 34, in order to submit a transaction via a live agent channel 42, or via an interactive voice response (IVR) channel 44. An application on a mobile telephone 36 may also be used to submit a transaction via an "app" channel, and mobile telephone 38 may be used to submit a transaction via an SMS channel in which text messages (or similar) are used. A "text-to-pay" channel may also be used with mobile telephone 38. Although not shown, another possible channel is an automatic recurring top-up of a prepaid account of a mobile telephone (for example); such an automatic transaction may not necessarily be initiated by the individual, but may be generated from within processor 20.

As is known in the art, telephone 32 may use the Public Switched Telephone Network (PSTN), and wireless devices 34-38 may use a wireless network such as any digital or analog cellular network, a PCS network, a satellite network, a radio frequency network, or other similar wireless network to communicate with an enterprise 20. Computer 30 may use an Internet Service Provider to connect over the Internet to enterprise 20.

As one of skill in the art will appreciate, individuals around the world are using these channels and others to submit transactions that are forwarded to processor 20 around-the-clock, resulting in a constant order flow that is handled by customer relationship management (CRM) software 50. CRM software 50 is executing upon any suitable server computer or computers within an enterprise 20. The same computer (or others) may also be used by enterprise 20 to host the IVR system 44, the risk decision engine 70, or for other functions needed to implement the payment processing system.

As will be appreciated, the incoming order flow from these channels includes a variety of data that is not only specific to a particular transaction but also may be specific to the channel being used by the individual, and, certain data is collected and stored for each transaction. For each transaction, the CRM software stores into transaction data 60 a record of each transaction, typically storing data elements such as: payment card number (which may be encrypted), expiration date, name and address of the individual, geographical location where the individual is located, amount of the transaction, e-mail address, shipping name and address, IP address of the computing device being used, telephone number of the channel being used, device information of the computing device being used, Internet service provider (ISP) being used, device fingerprint and related device characteristics, social media network linkages, etc.

Continuously, or periodically, the information records in transaction data 60 are used to generate any number of profile tables 64. A profile table is basically a counter based upon a particular data element found within transaction data 60. For example, a profile table for a payment card number may indicate the number of transactions attempted per particular payment card the day before, during the last week, during the last three months, etc. A profile table for the data element bank identification number or BIN (the first six digits of the payment card number which identifies a bank) may indicate the number of transactions attempted per issuer in a particular time period. Or, a profile table for ZIP code indicates the number of attempted transactions originating from particular ZIP codes in a given time period. Because the order flow is constant, the profile tables are updated in real time as transactions are stored within transaction data 60.

As will be explained in greater detail below, risk decision engine 70 includes algorithms to process an incoming transaction, and using profile tables 64, makes a decision as to whether to process a transaction 72, to deny a transaction 74, or to submit a transaction for further manual review 76. The outputs 72, 74 or 76 from risk decision engine 70 may take the form of computer instructions given to CRM software 50, may be output onto a display of a computer screen, may be printed, maybe output via a speaker, etc. The outputs may also be used as input into another algorithm for further analysis or may be fed back into the decision engine in order to directly alter the behavior of the on-line production system related to fraud.

Accordingly, the risk decision engine may direct the CRM software 50 to communicate with the acquirer bank 82, communicate with the issuer bank 84 and communicate with the merchant billing platform 86 (such as for a telecommunications carrier) about whether or not to recharge a particular telephone, whether to reload money onto a virtual gift card, whether or not to ship the physical or digital goods that the individual wishes to purchase, etc. For example, if the decision engine 70 decides to process 72 a transaction, then an authorization is requested from the issuer bank (typically via the acquirer bank), the merchant 86 is directed to deliver the goods or services to the individual, and eventually the issuer bank settles with the acquirer bank. If the decision engine decides to deny 74 a transaction, then no payment settlement is sent, and the merchant is informed that the transaction is denied (and no goods or services will be delivered).

Node Exclusion Overview

Figure 2:
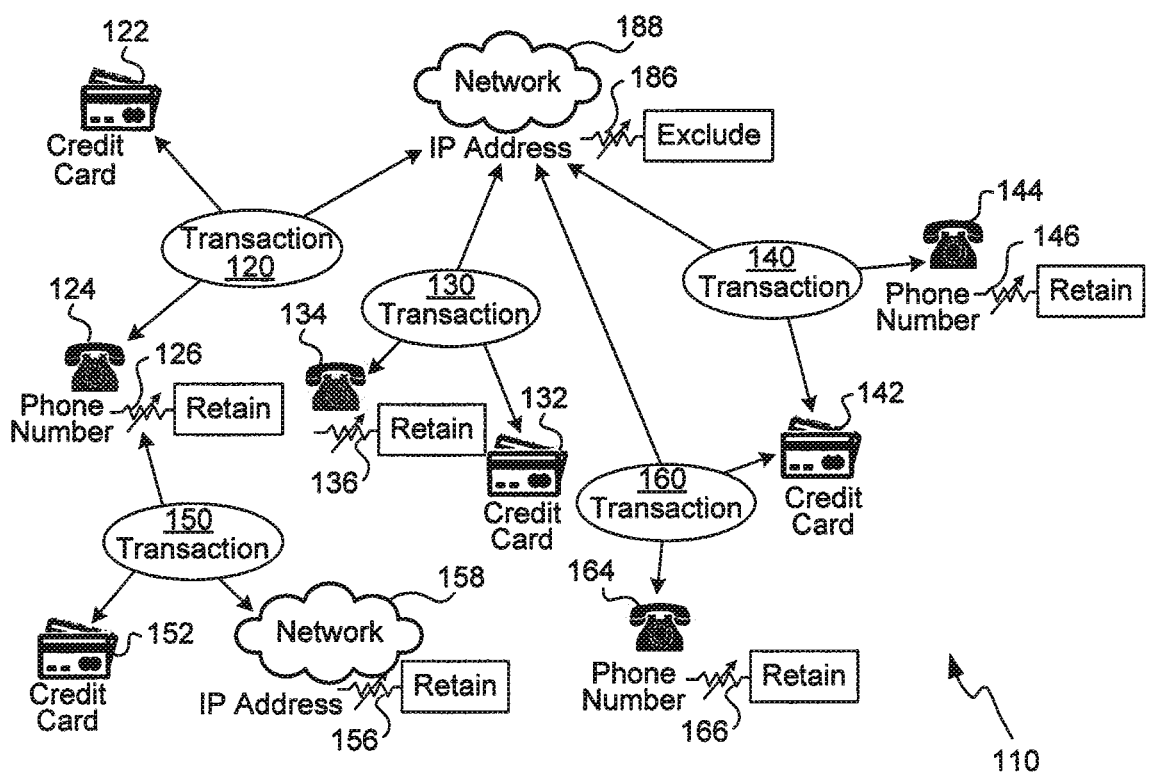
FIG. 2 illustrates conceptually how node exclusion may be performed in real-time during link analysis.

FIG. 2 illustrates conceptually how node exclusion may be performed in real-time during link analysis. Shown is an example link analysis web 110 and sample transactions 120, 130, 140, 150 and 160. Each transaction that is captured by payment processing system 10 will have a variety of transaction data associated with it (as explained above) and as used herein, each data element is referred to as an "entity." In this simple example, only three entities are shown for each transaction (i.e., credit card number, telephone number and IP address) although one of skill will understand that many other entities are associated with a transaction and that network 110 will be far more complex in real life. The other entities may include: payment device number (credit card number, debit card number, electronic check number, etc.); name and address; e-mail address; device identifier fingerprint; or gift card number. In addition to these entities present within many transactions, most all transactions will include the following data: date; amount; transaction status (approved, bank decline, processor decline); AVS status (match, mismatch); CVV status (match, mismatch); ticket (flagging a transaction for a manual review).

As shown, transaction 120 is associated with a particular credit card number 122 and a telephone number 124. Similarly, transaction 130 is associated with a credit card number 132 and a telephone number 134. Transactions 140, 150 and 160 are also each similarly associated with a credit card number and a telephone number. Note that, interestingly, transactions 120, 130, 140 and 160 are each associated with the same IP address 188, perhaps indicating that each of these transactions has originated from the same computer. Other shared entities (or nodes) within network 110 include telephone number 124 and credit card number 142. These shared nodes (i.e., node 188, node 124 and node 142) may indicate an anomaly or fraud, or may be an erroneous link and should be excluded from link analysis because there is a legitimate reason why these nodes are shared.

The present invention operates to calculate a particular metric or metrics for these shared nodes in order to determine if a node should be excluded from link analysis. For example, measurement symbol 126 indicates that a metric has been calculated and a decision made to "Retain" shared node 124 within the network. Further, measurement symbols 136, 146, 156 and 166 also indicate that a metric has been calculated and a decision made to "Retain" each of their corresponding nodes. Note that even though this simple example does not show these nodes as being shared, it is possible they would be shared in a real-life more complex situation. Finally, measurement symbol 186 indicates that a metric has been calculated and a decision made to "Exclude" shared node 188 from network 110 because it is realized that this shared node is not indicative of fraud. Likely, IP address 188 is a public, shared IP address between many individuals for legitimate reasons. Thus, the present invention is able to determine in real time if shared nodes within a link analysis web should be excluded or not. Nodes that are shared for legitimate reasons are excluded from link analysis while nodes that are shared for unknown or fraudulent reasons are retained within the link analysis web.

Figure 3:
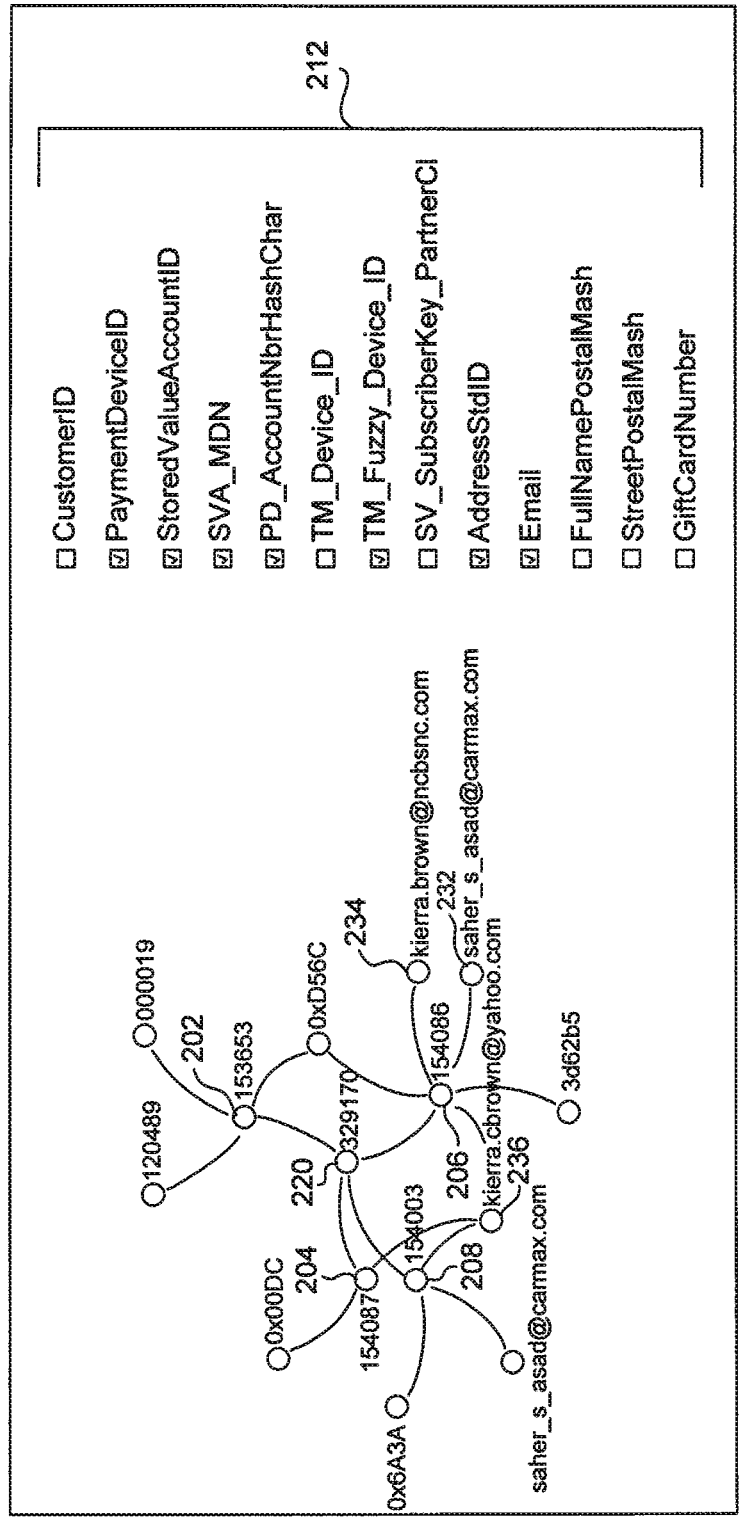
FIG. 3 also illustrates conceptually how node exclusion may be performed in real-time during link analysis.

FIG. 3 also illustrates conceptually how node exclusion may be performed in real-time during link analysis. Shown is an example link analysis web 210 representing any number of transactions. In this simple example, the network 210 includes entities such as payment card number, address, e-mail address and device fingerprint ID. Other entities that may also be represented within the network are shown at 212.

In this example, nodes 202-208 represent different credit card numbers that have been used in different transactions. Note that they all share a common node 220 which represents an address. At this point it is yet to be determined whether or not node 220 is an erroneous node that should be excluded. If node 220 represents the address of an apartment complex from which different individuals have initiated transactions using credit card numbers 202-208, then perhaps node 220 is erroneous and should be excluded. If, however, node 220 is the address at which a single individual is initiating transactions using stolen credit card numbers, then node 220 will not be excluded.

Note that a node such as 206 which represents a credit card number and is linked to a common node 220 may also be a common node itself. Nodes 232-236 each represent a different e-mail address and each of these nodes share common node 206. If nodes 232-236 share a common credit card number for a legitimate reason (such as one person may have multiple email addresses) then common node 206 should be excluded from link analysis. But, if a fraudster is using three different e-mail addresses with a common credit card number then the node should not be excluded.

Figure 4:
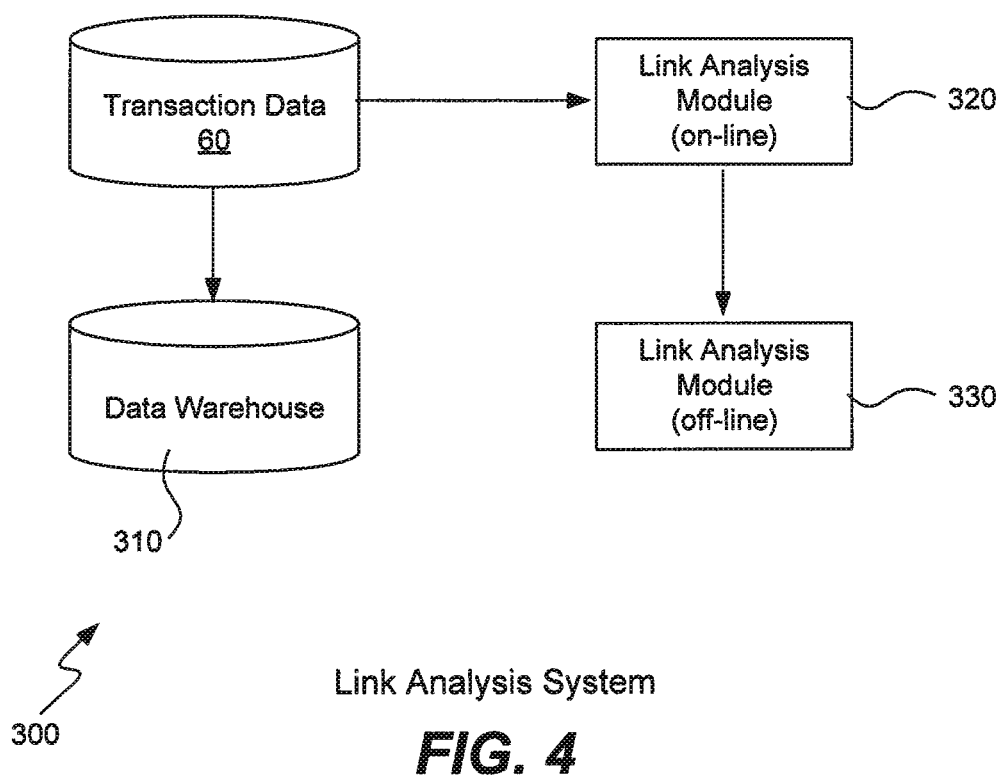
FIG. 4 illustrates link analysis system according to one embodiment of the invention.

FIG. 4 illustrates link analysis system 300 according to one embodiment of the invention. System 100 may be implemented upon the computer used by engine 70, or upon other computers within an enterprise 20, and is typically part of risk decision engine 70. As mentioned above, the payment processing system of FIG. 1 includes a risk decision engine 70 that uses transaction data 60 to make decisions in real time as each transaction is processed. Also in real time, each transaction is also fed into link analysis module 320 in order to make a decision in real time as to whether a particular node within a link analysis web should be excluded or not. If a node should be excluded, then that node is passed to link analysis module 330 for off-line processing in order to flag the entity of that node as being excluded. Module 330 in this embodiment is an off-line module separate from module 320. Separation of these modules allows the online module 320 to perform its processing in real time. In other embodiments, modules 320 and 330 may be combined and may both perform processing online if a powerful enough computer is used to perform all of the processing in real time.

Detailed Flow Diagrams

Figure 5:
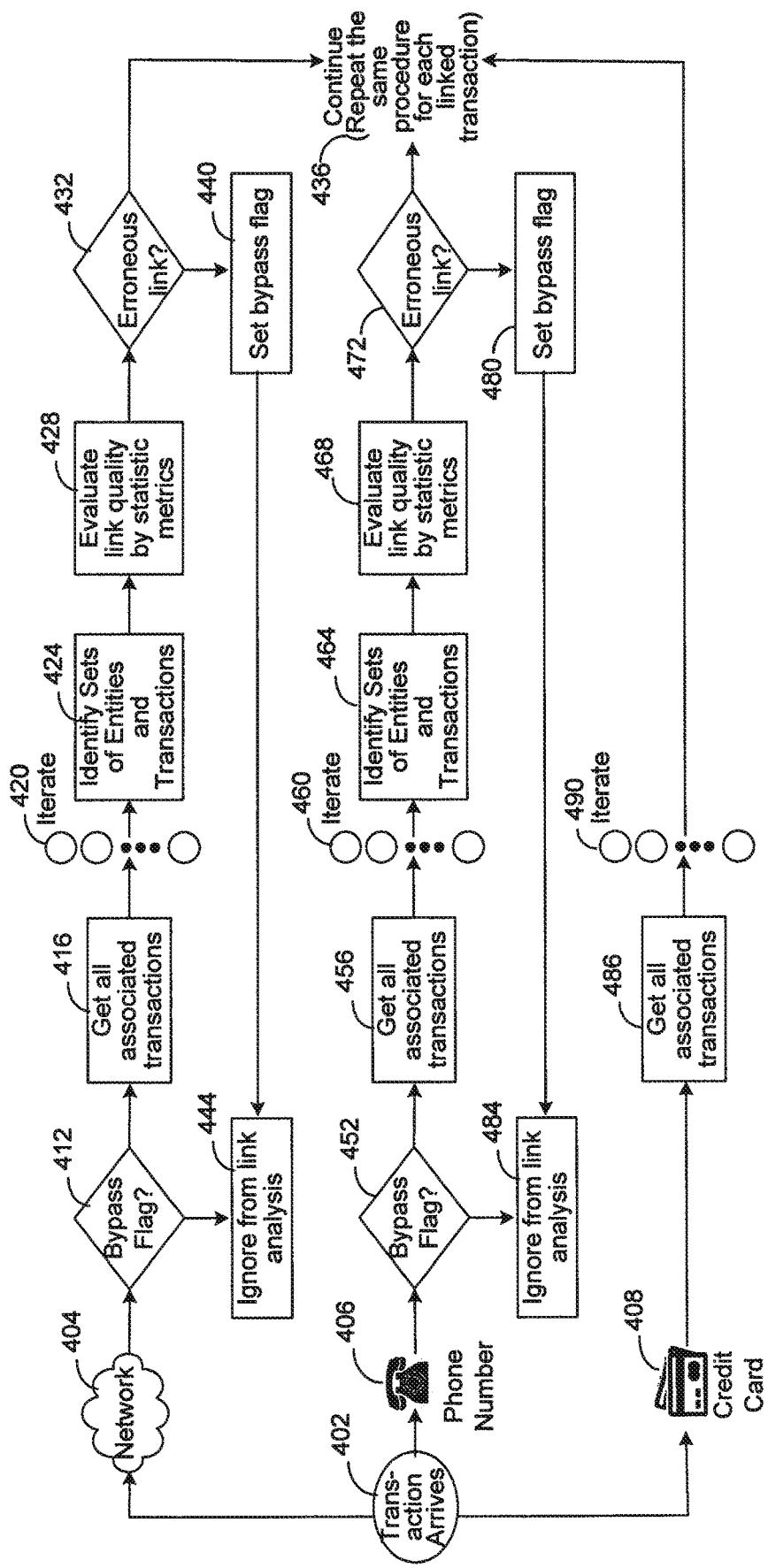
FIG. 5 is a flow diagram describing one embodiment by which a node may be excluded from link analysis.

FIG. 5 is a flow diagram describing one embodiment by which a node may be excluded from link analysis. As mentioned above, transactions arrive continuously, in real time, into payment processing system 10. As a given transaction 402 arrives, its data is forwarded to link analysis module 320 for analysis. Each entity of transaction 402 will be processed (either serially or in parallel) to check if a bypass flag has been set, and if not, to iteratively retrieve all associated transactions and to check for an erroneous link. The simple example of FIG. 5 only shows three entities 404-408 that are each processed in a separate branch after transaction 402 arrives. Typically, each entity of the transaction will be processed in a similar way in order to build a link analysis web. The following entities are typically analyzed in order to build the web: payment card number, name and address, device fingerprint identifier, telephone number, e-mail address, and IP address.

Using the entity "IP address" 404 as an example, the upper branch of this flow diagram will now be described. In step 412 the entity IP address is extracted from the current transaction and it is checked whether or not a bypass flag has been set for this entity. If a bypass flag has been set for this entity (or, if the entity is present in its corresponding bypass table) this means that this particular entity should not be used to retrieve associated transactions and should be excluded from the link analysis web. Typically, this is because the entity is likely not to be a good indicator of fraud. For example, as described above, an IP address that is used in many transactions is not an indicator of fraud if that IP address is an address of a gateway server within a corporation used legitimately by many individuals; therefore, a node representing that IP address should be excluded from a link analysis web. Accordingly, this particular entity is ignored in step 444, no associated transactions are received, and this particular entity is not used to further grow the link analysis web. Bypass flags and tables are discussed in more detail below. If a bypass flag has not been set, then in step 416 all transactions associated with the IP address 404 of transaction 402 are retrieved and a link analysis web is built.

Figure 6:
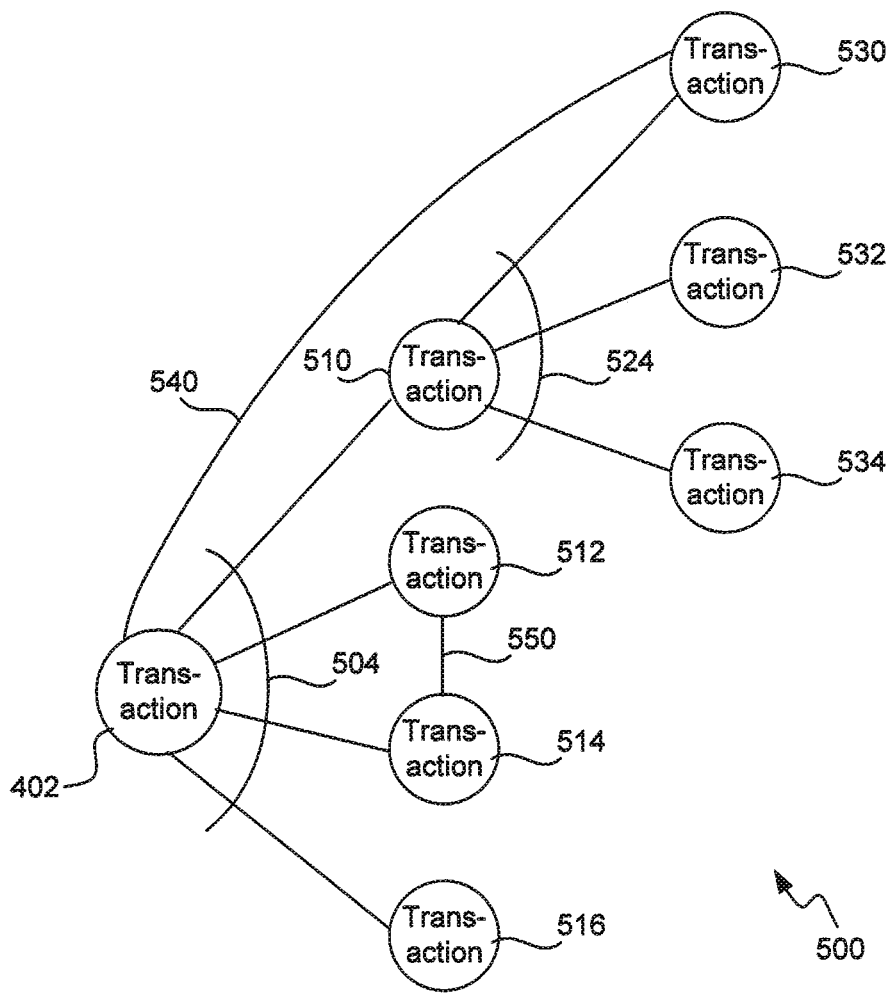
FIG. 6 is an example of a link analysis web that is based upon the IP address of a particular incoming transaction.

FIG. 6 is an example of a link analysis web 500 that is based upon the IP address of a particular incoming transaction. Starting from an original transaction 402, reference 504 indicates transactions 510-516 that are associated with transaction 402 because they each have an IP address in common. Of course, each of transactions 510-516 will each also have its own entities such as payment card number, IP address, telephone number, etc. Although transaction data 60 (and to a greater extent, data warehouse 310) can store historical transaction data for long periods of time, it is preferable to look back about six months in time in order to find associated transactions in step 416. Of course, depending upon the fraud environment, business decisions and design choices, this window of time may be longer or shorter.

Once a group of transactions is retrieved in step 416 and the system begins to build a link analysis web, then in step 420 an iterative process is performed in which each transaction retrieved in step 416 is then analyzed per entity in order to continue growing the link analysis web. By way of example, each entity of transaction 510 is then used to find other transactions associated with transaction 510. Thus, reference 524 indicates transactions 530-534 that are associated with transaction 510 because they each have a telephone number in common. Although not shown, other links will emanate from transaction 510 indicating other transactions that are associated with transaction 510 via its other entities such as IP address, payment card number, etc. And, each of transactions 512-516 will also be analyzed in this way in order to grow the network. Iteration may be performed many times, or not all, although preferably it is performed anywhere from three to five times. The final network 500 may be very complex and may include links such as 540, in which a later added transaction is linked to a transaction already present in the network, or links such as 550 in which transactions added in the same iteration are linked to one another.

Although not shown, during each iteration of step 420 each entity of transaction 510 (for example) is checked against the bypass tables. If present in any of the bypass tables, then a node representing that entity is excluded from the link analysis web and no transactions associated with that particular entity are retrieved and the link analysis web is not further grown using that particular entity. Bypass tables are discussed in more detail below.

The above has explained how a link analysis web may be built and nodes excluded during the course of following branch 404 of FIG. 5 based upon the IP address from transaction 402. As mentioned earlier, the link analysis module is also following branch 406 and branch 408 (based upon the telephone number and credit card number, respectively, of transaction 402) either serially or in parallel, in order to build up the same link analysis web. Of course, other entities may also be used by the link analysis module to build the link analysis web, examples of which are shown in FIGS. 2, 3 and 6.

Note that branch 408 which analyzes the entity payment card number is a special case in that a bypass table is not checked and there are no corresponding steps 424-432 or 440. This is because only an extremely small number of payment card numbers are currently bypassed, in fact, there is currently only one payment card number that is bypassed, and this can be done without the need for a bypass table.

After iteration in steps 420, 460 and 490 is complete, and a complex link analysis web has been built, step 424 identifies sets of entities and transactions. After steps 420, 460 and 490, the result is a set of IP addresses from the link analysis web, a set of telephone numbers, a set of payment card numbers, etc. Indeed, there will be a set for each and every entity that appears in the transaction data. For example, even if the example of FIG. 5 is used to build the link analysis web, there will be sets for each kind of entity in the transaction data. And, there will be a set of transactions that includes all of the transactions present in the link analysis web that has just been built (e.g., all of the transactions appearing in network 500). Even though steps 424 and 464 appear in both branches, step 464 is the same as 424, meaning that the step of "Identify Sets of Entities and Transactions" is performed once after steps 420, 460 and 490 are completed.

Next, in step 428 the link quality in this set of transactions is evaluated by using any of a variety of transaction-based metrics. A transaction-based metric determines a rate of a particular transaction attribute within the link analysis web. For example, if the link analysis web provides a set of one hundred transactions that are associated, the address mismatch rate is the percentage of transactions within that group in which the AVS status is "mismatch." Or, the bank decline rate is the percentage of transactions within that group in which the transaction status is "bank decline." Similar rates may also be calculated for other entities or transaction elements such as ticket decline rate or new payment device rate. The ticket decline rate is the percentage of transactions within that group in which a ticket was opened for a transaction and the transaction was eventually declined. The new payment device rate is the percentage of transactions within that group in which the payment device used is relatively new to the payment processing system, i.e., the age of the payment device is less than a certain number of days.

All of these transaction-based metrics indicate possible fraud within the network if their values are relatively high. In other words, a high AVS mismatch rate indicates lots of address mismatches, a high bank decline rate indicates that many transactions are denied by a bank, a high ticket decline rate indicates that many transactions are declined after a review, and a high new payment device rate indicates many payment devices are relatively new. Thus, high values for these metrics indicate that the link analysis web is relatively accurate because it may show fraud and that nodes should not be excluded. Conversely, low values for these metrics indicate that there is little fraud within the network and perhaps some nodes should be excluded. For example, a low value for the AVS mismatch rate metric may be due to a common IP gateway address that is legitimate. If so, it may be necessary to exclude the node representing this common IP address as explained above.

Accordingly, step 428 calculates risk metric values for each of the four transaction-based metrics mentioned above. Other metrics may be used, and preferably, a value is calculated for each of the risk metrics based upon the current set of transactions derived from the link analysis web. Even though steps 428 and 468 appear in both branches, step 468 is the same as 428, meaning that the step of "Evaluate Link Quality by Statistic Metrics" is performed once after step 424 is completed.

Figure 7:
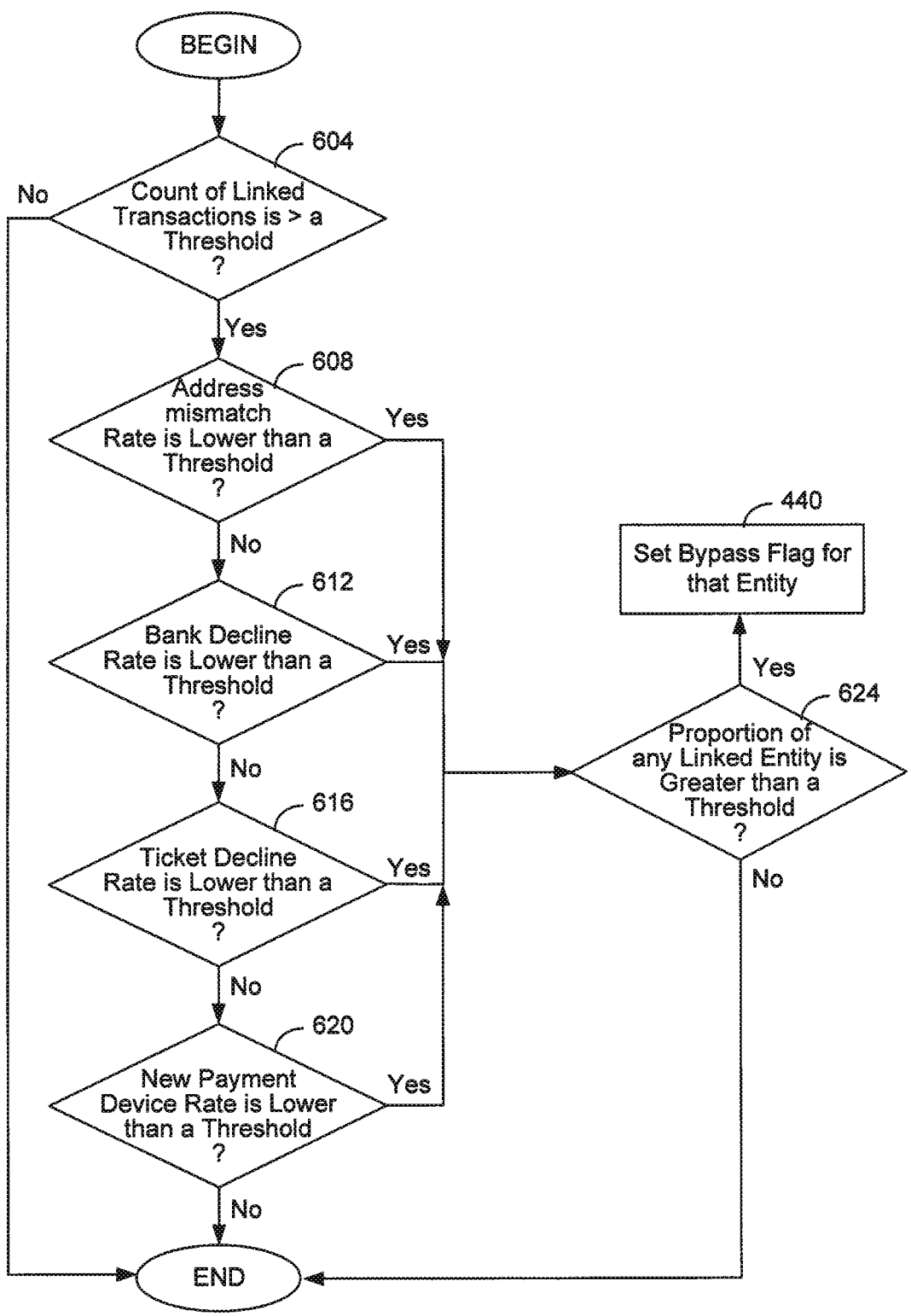
FIG. 7 is a flow diagram describing the details of step 432.

FIG. 7 is a flow diagram describing the details of step 432. Step 432 determines whether a link to a particular node in the link analysis web is erroneous and should be removed by setting a bypass flag. First of all, step 604 determines whether the count of all linked transactions within the recently built link analysis web is greater than a particular threshold value. The idea is that a link analysis web with relatively few transactions should not be subject to further analysis. Typically, it is only networks having a large number of transactions in which nodes need to be excluded. A typical threshold value for this step is about 200.

If the count is greater, then steps 608-620 determine whether one of the risk metric values calculated in step 428 is lower than a particular threshold value. Each step may use a different threshold value and examples of threshold values for each of these steps are 0.05. If at least one of the rates is lower than its corresponding threshold value, this indicates that the network may indicate relatively little fraud as explained above, and that one or more nodes should be excluded from the network. Accordingly, control then moves to step 624 in which it is determined if a proportion of any linked entity within the network is greater than its corresponding threshold value.

Step 624 iterates over each set of entities identified in step 424 and may exclude a node or nodes during each iteration over each set. For example, consider the set of IP addresses represented within the network identified in step 424. Step 624 considers each IP address in this set one-by-one and determines to how many different credit card numbers each IP address is linked. For example, FIG. 2 shows that IP address 188 is linked to three different credit card numbers. Next, the proportion of linked payment card numbers for each IP address out of all payment card numbers within the network is determined. For example, if a particular IP address in the set is linked directly to twenty payment card numbers, and there are total of 200,000 payment card numbers in the network, then the proportion is 1/10,000. If any one of these proportions for a particular IP address is greater than a threshold, then the node representing that particular IP address will be excluded by setting a bypass flag for that particular IP address in step 628. A bypass flag may be set for each IP address whose proportion is greater than the threshold. And, as mentioned, step 624 iterates over every set of entities determined in step 424, excluding nodes by setting bypass flags for particular entities whose proportion is greater than a threshold. The entity payment card number is used to calculate the proportion in step 624 because a payment card number is typically not likely to be shared between nodes and is thus more effective. In other embodiments, another entity instead of payment card number may be used if it is not likely to be shared between individuals.

Other metrics may be used by the link analysis module to help determine whether or not a node should be excluded from a link analysis web. For example, if link analysis determines that a single payment device is linked to ten different e-mail addresses, and that there are 10,000 e-mail addresses in a group, then the proportion of entity for that particular payment device is the proportion 10/10,000 or 1/1,000.

Continuing with the example of a particular IP address that is linked directly to 20 credit card numbers, this particular IP address will be excluded because at least one of the transaction-based risk metrics in steps 608-620 indicates that fraud is low in the network, and because this particular IP address is linked to a relatively high number of payment card numbers. Thus, it is likely that this is an IP address of a common gateway computer used by a corporation and that transactions using this IP address are legitimate.

A node may be excluded from the link analysis web or a bypass flag may be set for a particular entity using any of a variety of techniques. As shown in FIG. 5, step 440 sets a bypass flag, meaning that the particular entity flagged will not be used in the future to build the link analysis web. Steps 472 and 480 the same as steps 432 and 440, but may happen separately.

In one example, if a particular IP address is flagged in step 440 then that IP address will be excluded from building the link analysis web in future steps. But, it is possible that the link analysis web already includes that IP address as a node based upon a previous iteration. In that case, the link analysis web will modified in order to remove any nodes corresponding to that IP address. In one implementation, if a bypass flag is set for an IP address already appearing in the web as a node, then link analysis will be restarted in order to perform link analysis excluding that IP address.

Returning to FIG. 7, if the count is not greater than the threshold in step 604, if none of the rates are lower than a threshold in steps 608-620, or if no proportion is greater than a threshold in step 624, then the flow diagram ends and no bypass flag will be set.

FIG. 8 lists numerous bypass tables that may be used in steps 440 and 412 in order to exclude a particular entity and node from the link analysis web. Of course, other tables may be used and other techniques may be used. In this embodiment, each row of FIG. 8 represents a particular bypass table that holds values for the entity listed that should be excluded from a link analysis web. For example, table 704 is a table of specific IP addresses that should be excluded from building a link analysis web when the tables are checked in step 412. In addition to being checked in step 412 before the first set of associated transactions are retrieved in step 416, the bypass tables are also checked during each iteration in step 420 before transactions are retrieved and placed into the link analysis web.

For example, FIG. 6 is an example of a link analysis web built as described above in steps 416 and 420. Reference 504 represents a particular IP address used to bring in transactions 510-516. But, had that particular IP address of transaction 402 been present in table 704 during step 412, then transactions 510-516 would not have been placed into the link analysis web because that particular IP address was in the bypass table. Similarly, reference 524 indicates a particular telephone number of transaction 510 (assuming that transaction 510 has been brought into the network). But, if that particular telephone number had been present in table 716 during any of the iterations in step 420, then transactions 530-534 would not have been brought into the link analysis web.

In general, the bypass tables are checked in step 412 and before each iteration in step 420 (and also in the corresponding steps in branch 406) in order to determine whether the entity that might be used to bring in new transactions is in the bypass table. If so, then those transactions will not be added to the network using that particular entity. But, note that even if a particular IP address is added to its bypass table 704 during step 440, it is possible that a transaction including that particular IP address may be brought into the network during branch 406 based upon a different entity. If so, that IP address will then be excluded from growing the network in a later iteration because it is in the bypass table.

The various bypass tables for a particular entity include a table of IP addresses 704, a table of SVA account numbers 708, a table of full name combined with postal code 712, a table of telephone numbers 716, a table of e-mail addresses 720, a table of payment device account numbers 724, a table of customer identifiers used internally by a payment processing system 728, a table of source CDs 732, a table of an address combined with standard ID 736, a table of gift card numbers 740, a table of SVA MDN numbers 744, a table of street name combined with postal code 748, a table of payment device identifiers 752, a table of TM fuzzy device identifiers 756, a table of TM device identifiers 760, and a table of SVA identifiers 764. Not all of these entities or bypass tables may be in use at a particular time. Preferably, the data in the bypass tables are kept from transaction to transaction for future use. Step 436 continues the process for the transactions linked by the entities that are associated with the original transaction, as discussed above.

Figure 9:
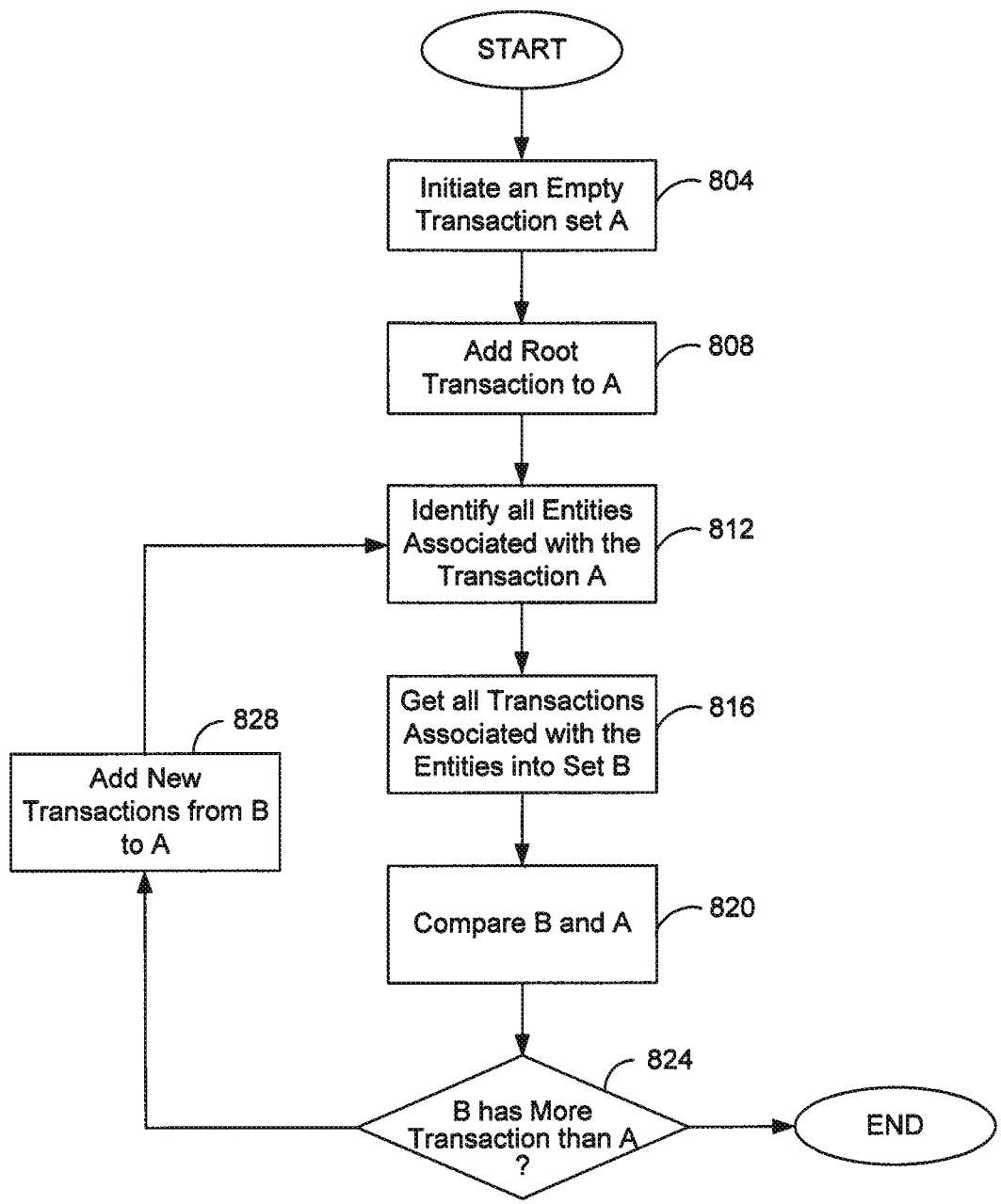
FIG. 9 is a flow diagram describing in general how a link analysis web may be built.

FIG. 9 is a flow diagram describing in general how a link analysis web may be built. Details of how a link analysis web may be built making use of risk metrics and bypass tables have been described above with reference to FIG. 5. The embodiment of FIG. 9 describes the process of building a link analysis web at a higher level. Referring to FIG. 5, a link analysis web is built starting from transaction 402 and then a fraud decision is made using this web. After that decision has been made, the link analysis web is discarded and a new link analysis web is created when the next transaction arrives.

In step 804 a transaction set A is created that is empty. In step 808 the first root transaction is added to set A. This step is analogous to the arrival of transaction 402 when that transaction is added to the link analysis web. In step 812 all of the entities found within each transaction in set A are identified. This step is analogous to step 416 and corresponding steps 456 and 486. Although not shown, it is inherent in this step that the list of bypass tables is consulted for each identified entity, and each entity found within one of the bypass tables is excluded.

Step 816 retrieves all the transactions associated with all of the identified entities (except for those entities that have been excluded) and places them into a set B. Note that this set B may include transactions within set A. Step 820 compares set B with set A, and, if in step 824 set B has more transactions than set A then in step 828 all of the new transactions found in set B are added to set A. Control then moves to step 812 to continue looping. Note that this looping construct is analogous to iteration steps 420, 460 and 490. If the result in step 824 is negative then the link analysis web has been built and the flow diagram ends.

FIG. 6 provides an example of how this flow diagram is implemented. At a given point in time in the iterative process, set A includes transactions 402 and 510-516. When all transactions associated with the entities are retrieved and placed into set B, set B will necessarily include all of the transactions currently in set A along with transactions 530-534. Transactions 530-534 are the new transactions. Because set B is larger than set A, these new transactions will be added into set A. Thus, set A now includes all of the transactions in FIG. 6. Assuming that this is the extent of the link analysis web based upon transaction 402, when all transactions associated with the entities are retrieved in step 816 to form a set B, set B will only include all the transactions currently in set A, namely those transactions shown in FIG. 6. Thus, set B will not have more transactions than set A (meaning that the link analysis web is complete) and the flow diagram will end.

Fraud Detection Using Link Analysis Web

Figure 10:
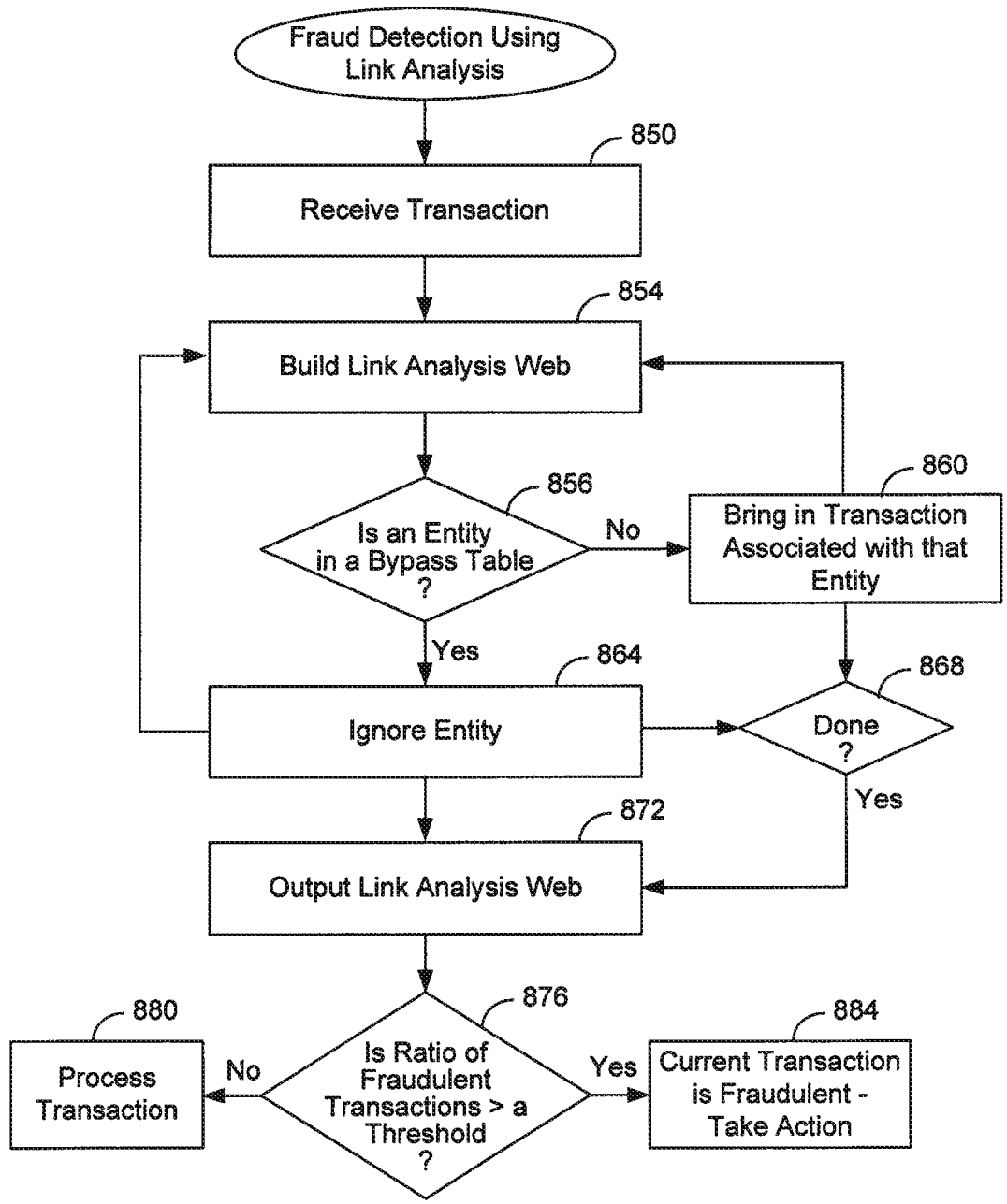
FIG. 10 is a high-level flow diagram describing one embodiment by which fraud is detected using the link analysis system described herein.

FIG. 10 is a high-level flow diagram describing one embodiment by which fraud is detected using the link analysis system described herein. The above description has provided details on how a link analysis web is built using a current transaction and how certain nodes and transactions are excluded from that web in order to increase the accuracy of that web. Once the web is built it will then be used to decide whether not the current transaction is fraudulent as described below.

In step 850 a current transaction is received within payment processing system 10 and is forwarded to the link analysis module for processing. In step 854 begins the process of building the link analysis web such as has been described with reference to FIGS. 5 and 9. During the course of that process, step 856 asks whether a particular entity in the transaction is present in any of the bypass tables in order to decide whether or not to bring in transactions associated with that entity. If not, then in step 860 all transactions associated with that entity are brought into the link analysis web and it continues to grow. If so, then in step 864 that entity is ignored, its node is excluded from the web, and transactions associated with that entity are not brought into the web. Control returns to step 854 to consider other entities and transactions.

Each of steps 860 and 864 will also make a determination 868 as to whether building of the link analysis web is complete. If so, then in step 872 the completed link analysis web is output. Output of the web may take many forms, and it is not strictly necessary that the web be output in a graphical form as has been shown in FIGS. 2, 3 and 6. Preferably, output of the web consists in outputting a list of transactions and a list of entities associated with the original transaction received in step 850.

Next, in step 876 a determination is made using this output information as to whether the current transaction is fraudulent. In one embodiment, if the ratio of fraudulent transactions within the web over the total number of transactions within the web is over a particular threshold then it is determined in step 884 that the current transaction is fraudulent and action is taken. If not, then in step 880 the transaction is processed. The particular threshold used may be adjusted from time to time depending upon environmental factors, design choices and business decisions, although a number in the range of about 0.2 to about 0.5 works fairly well. It is also possible to use the listed entities output to make the decision in step 876, or to use other rules and algorithms to decide whether or not to determine if the current transaction is fraudulent. A variety of ways may be used to determine whether or not a previous transaction is fraudulent. By way of example, those ways include: a chargeback; customer-reported fraud; an offline review; an offline machine learning algorithm; etc.

The actions that may be taken in step 884 will also depend upon environmental factors, design choices and business decisions. Typically, the current transaction will be denied, although it may be subject to further manual review. Also, it is possible to blacklist a particular credit card number or other entity, although it is unlikely that a particular screen resolution value would be blacklisted. Other actions that may be taken include: blacklisting a particular entity (such as a credit card number or BIN value); placing a velocity adjustment on a particular entity (i.e., restricting how fast that particular entity value can place orders in the future); model adjustment (i.e., changing input parameters or coefficients or weights in the model); and drawing down an allowed number of alerts for this particular entity value per day, week and month, etc.

Finally, in response to any of these actions that may be taken, a future transaction may be denied 74 or subject to further review 76 by risk decision engine 70 during real-time online production. Also, placing an attribute value (such as a particular IP address) into an exclusion table during step 854 (building the link analysis web) results in that node being excluded from the web. As mentioned earlier, exclusion of such erroneous nodes from the web improves the accuracy of fraud detection and reduces false positives. Thus, it is possible that a future transaction may be processed by the risk decision engine (instead of being denied) because of this exclusion of an erroneous node from the web.

As mentioned earlier with reference to FIG. 4, the link analysis module may split its processing into an online module 320 and an off-line module 330. In one embodiment, steps 850-884 occur in real time as each transaction is received and are handled by the online module 320. In this embodiment, steps 428, 432 and 440 are handled by the off-line module 330 and may take place any time after the transaction is received and processed. By creating a link analysis web in real time and excluding entities present in a bypass table, a decision regarding whether or not the current transaction is fraudulent can be made quickly and accurately. The off-line processing can occur at a later time when more processing power is available. In an alternative embodiment, assuming processing power is available, the off-line processing steps may also be handled online and in real time by the online module 320.

Computer System Embodiment

Figure 11A:
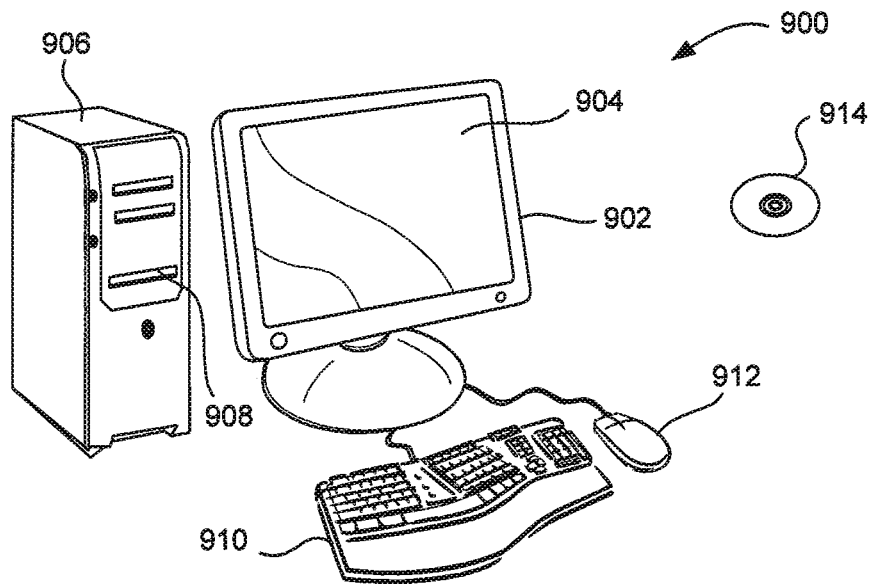
FIGS. 11A and 11B illustrate a computer system suitable for implementing embodiments of the present invention.
Figure 11B:
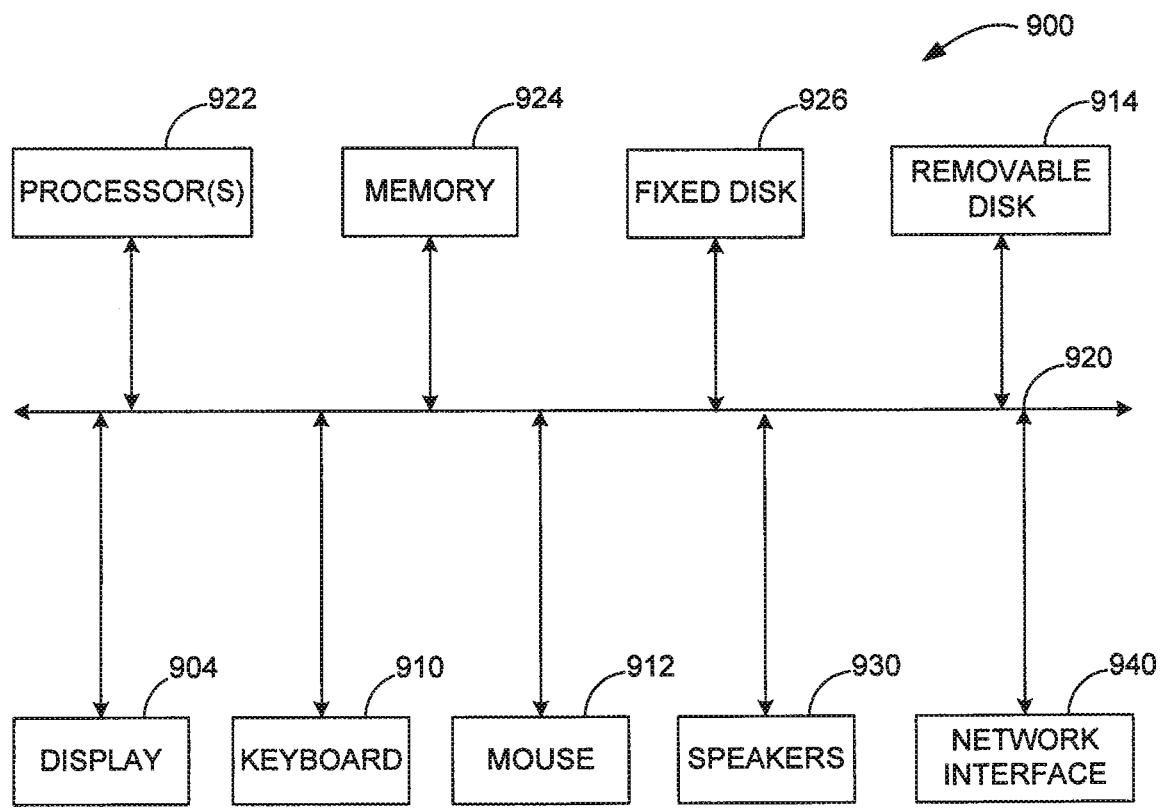

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of outputting in real time a result of an electronic, card-not-present transaction using link analysis, said method comprising:
    receiving a plurality of payment transactions in a payment processing system from a plurality of computing devices, wherein each of said plurality of payment transactions is associated with a payment device and includes a plurality of data elements, and wherein each of said plurality of data elements is specific to said each payment transaction or to one of said computing devices, said plurality of payment transactions including a current payment transaction from an individual, and wherein said plurality of data elements include at least one of a payment card number, an expiration date, a name of an individual, an address, a geographical location, an amount of said each payment transaction, an e-mail address, a shipping name and address, an IP address, a telephone number, device information, an Internet service provider (ISP), a device fingerprint, or a social media network link;
    determining that an IP address in said current payment transaction is not an indicator of a fraudulent payment transaction;
    determining that said IP address is flagged to be excluded from a link analysis web;
    building said link analysis web using at least one data element of said current payment transaction other than said IP address and using at least one of the data elements of said plurality of payment transactions, those of said payment transaction including said IP address not being used to build said link analysis web, wherein said link analysis web includes links between data elements of said plurality of payment transactions, and wherein each data element of said link analysis web represents one of said plurality of payment transactions;
    outputting a set of said represented plurality of payment transactions in said link analysis web;
    determining whether said current payment transaction is fraudulent by determining that a ratio of fraudulent payment transactions within said set of represented plurality of payment transactions in said link analysis web over the total number of said set of represented plurality of payment transactions in said link analysis web exceeds a threshold; and
    processing or declining said current payment transaction in real time, depending upon a result of said determining whether said current payment transaction is fraudulent.

2. A method as recited in claim 1 wherein said processing or declining occurs on the order of seconds after said receiving.

3. A method as recited in claim 1 further comprising:
    calculating at least one risk metric of said represented plurality of payment transactions in said link analysis web indicating lower risk;
    determining that a node of said link analysis web that includes a second data element is linked to a proportion of said payment devices within said link analysis web greater than a threshold; and
    removing said second data element from said link analysis web.

4. A method as recited in claim 1 wherein said IP address is flagged by being present in a bypass table.

5. A method as recited in claim 1 further comprising:
    iteratively building said link analysis web.

6. A method as recited in claim 1, further comprising:
    not delivering digital goods or services associated with said current payment transaction from a merchant which had submitted said current payment transaction to said payment processing system based upon said associated payment device to said individual when it is determined that said current payment transaction is fraudulent.

7. A method as recited in claim 1, further comprising:
    delivering digital goods or services associated with said current payment transaction from a merchant which had submitted said current payment transaction to said payment processing system based upon said associated payment device to said individual when it is determined that said current payment transaction is not fraudulent.

8. A method as recited in claim 1, further comprising:
    outputting said set of all data elements in said link analysis web of the same type; and
    determining whether said current payment transaction is fraudulent using said set of all data elements.

9. A method as recited in claim 8, further comprising:
    not delivering digital goods or services associated with said current payment transaction from a merchant which had submitted said current payment transaction to said payment processing system based upon said associated payment device to said individual when it is determined that said current payment transaction is fraudulent.

10. A method as recited in claim 8, further comprising:
    delivering digital goods or services associated with said current payment transaction from a merchant which had submitted said current payment transaction to said payment processing system based upon said associated payment device to said individual when it is determined that said current payment transaction is not fraudulent.

* * * * *